(No Model.)

J. C. F. SCHENCK.
ATTACHMENT FOR PLOW COLTERS.

No. 482,387. Patented Sept. 13, 1892.

WITNESSES=
L. G. Susemihl
F. N. Porter

INVENTOR=
John C. F. Schenck
per Wm K. White
Attorney

UNITED STATES PATENT OFFICE.

JOHN C. F. SCHENCK, OF MOLINE, ILLINOIS.

ATTACHMENT FOR PLOW-COLTERS.

SPECIFICATION forming part of Letters Patent No. 482,387, dated September 13, 1892.

Application filed June 28, 1892. Serial No. 438,270. (No model.)

*To all whom it may concern:*

Be it known that I, JOHN C. F. SCHENCK, a citizen of the United States, residing at Moline, in the county of Rock Island and State of Illinois, have invented a new and useful Attachment for Plow-Colters, of which the following is a specification.

My invention relates to a device for attaching the shank of a colter to the plow-beam, and has for its objects, first, the retention of the colter-shank in a line parallel with the sides of the plow-beams; second, permitting movement of such shank to or from the plow-beam; third, ability to secure or fasten such shank at any desired position within the limits of its permitted lateral movement, and, lastly, such further objects as will be hereinafter referred to. I accomplish these objects by the mechanism illustrated in the accompanying drawings, in which—

Figure 1:
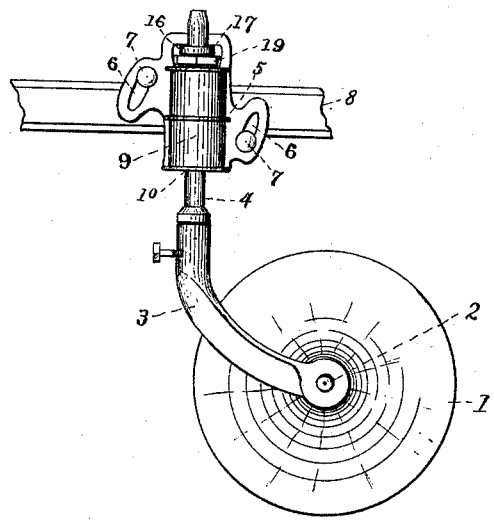

Figure 1 is a side view of my device as it appears when in operative position, and Figs. 2, 3, 4, and 5 are views of enlarged detailed parts which will be hereinafter fully described.

Similar numerals of reference refer to similar parts throughout the several views.

1 represents a rolling or rotating colter disk or cutter; but it will be understood that in its place a stationary blade or cutter may be used, if desired, and of any suitable form, as my invention only relates to a device for attaching any suitable form of colter or cutter to a plow-beam. 2 represents the axle of said rolling colter or cutter. 3 represents a bifurcated arm supporting said axle, and 4 represents a shank to which said bifurcated arm is attached.

I construct a clamp-plate 5, provided at either end with elongated perforations or openings 6 6 to receive clip-arms or an equivalent, such as headed and threaded bolts 7 7, one of which passes above and the other below the plow-beam 8, and on the opposite side of the plow-beam passes through suitable perforations in a plate or strap bearing against the opposite side of such plow-beams and being secured by suitable nuts upon such bolts 7, adapted to secure or fasten said clamp-plate to the plow-beam. As either of these methods of fastening a clamp-plate to a plow-beam is well known and commonly used, I have not illustrated the same fully in the drawings.

Figure 2:
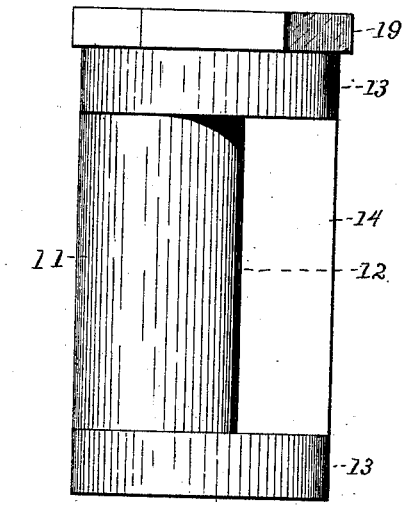
Figure 4:
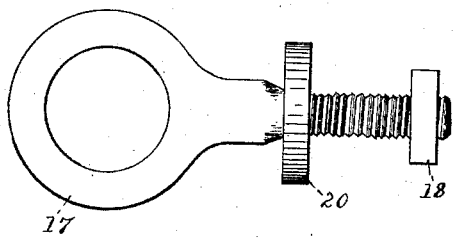
Figure 3:
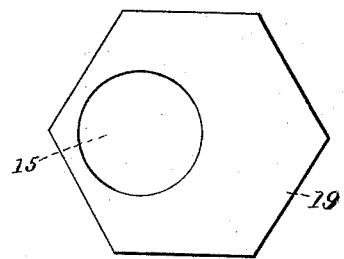
Figure 5:
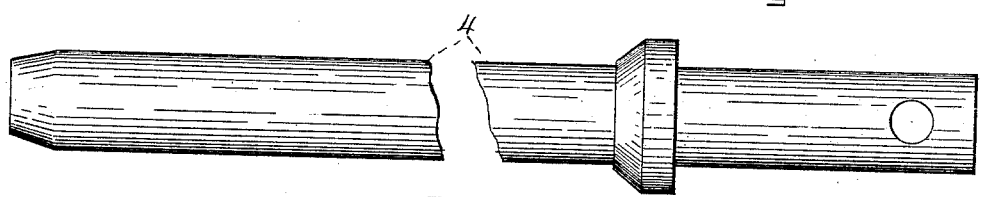

The face side of the clamp-plate is provided with a projection or box 9, preferably integral therewith, having a vertical circular opening 10 therein, and which opening is adapted and constructed to receive a circular sleeve 11, and which sleeve, for the purposes of decreasing its weight and economy in material, may be at one side cut away and, as at 12, leaving, however, at the top and bottom the circular part 13 13, as illustrated in Fig. 2, and for strength and certainty of movement may have the fin 14, as also illustrated in Fig. 2; but these are not essential features of my invention, but are only ecomomic features which may be considered.

The sleeve 11 is provided with a vertical circular eccentric opening 15, adapted and constructed to receive the colter-shank 4, so that it may easily turn therein. At the upper end of said clamp-plate and above the projection or box 9 is an elongated horizontal perforation 16.

The eyebolt 17 is so constructed and adapted that its eye will encircle the colter-shank 4, and its bolt, which is threaded, will pass through said elongated horizontal perforation 16 in the upper part of said clamp-plate 5 and be secured therein by means of a suitable nut 18 upon the threaded part of such eyebolt, bearing against the inner portion of such projecting part of said clamp-plate. The upper end of said sleeve 11 is also provided with an octagonal projection 19, constructed and adapted to be grasped by a wrench for the purpose of turning or rotating such sleeve in the opening 10 of the projection or box 9; but it will be understood that any other equivalent means for turning or rotating the same therein may be adopted or used. It will also be understood that a washer 20 may also be used upon the eyebolt with said nut 18, if desired. It will be seen that the opening in the sleeve forms a socket for the colter-shank, while the opening in the projection or box likewise forms a socket for the sleeve, and by turning or rotating the sleeve therein the eccentric socket of the latter carrying the colter-shank moves the latter laterally to or from the plow-beam within its prescribed limits, and when in the desired position the eyebolt encircling the colter-shank is fastened or clamped to the clamp-plate by means of the nut, and thus the sleeve and colter-shank are locked or securely held in such position.

It will be readily understood that many modifications and changes may be made in my device without departing from the scope of my invention, and from the description given persons skilled in the art will readily understand the construction and operation of my device.

What I claim as new, and desire to secure by Letters Patent, is—

The combination, in a colter attachment, of the clamp-plate provided with the projection having a vertical circular opening therein, the sleeve adapted and constructed to fit in such opening, such sleeve provided with the vertical circular eccentric opening adapted and constructed to receive the colter-shank, the octagonal projection at the upper end of such sleeve, the horizontal opening at the upper end of said clamp-plate, the threaded eye-bolt adapted and constructed to encircle said colter-shank and its end to pass through said horizontal opening, and the nut for securing such eyebolt and colter-shank in the desired position, substantially as described.

JOHN C. F. SCHENCK.

Witnesses:
L. G. SUSEMIHL,
L. N. PORTER.